(12) United States Patent
Yamamoto (10) Patent No.: US 9,705,131 B2
(45) Date of Patent: Jul. 11, 2017

(54) POSITIVE ELECTRODE ACTIVE MATERIAL FOR NON-AQUEOUS ELECTROLYTE SECONDARY BATTERY AND METHOD FOR PRODUCING THE SAME

(71) Applicant: NISSAN MOTOR CO., LTD., Yokohama-shi, Kanagawa (JP)

(72) Inventor: Shinji Yamamoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/026,481

(22) PCT Filed: Oct. 4, 2013

(86) PCT No.: PCT/JP2013/077127
§ 371 (c)(1),
(2) Date: Mar. 31, 2016

(87) PCT Pub. No.: WO2015/049796
PCT Pub. Date: Apr. 9, 2015

(65) Prior Publication Data
US 2016/0218365 A1   Jul. 28, 2016

(51) Int. Cl.
*H01B 1/08*   (2006.01)
*H01M 4/00*   (2006.01)
(Continued)

(52) U.S. Cl.
CPC ........ *H01M 4/505* (2013.01); *C01G 45/1228* (2013.01); *C01G 53/50* (2013.01);
(Continued)

(58) Field of Classification Search
CPC .. H01B 1/00; H01B 1/08; H01M 4/48; H01M 4/525; C01G 45/1228
See application file for complete search history.

(56) References Cited

U.S. PATENT DOCUMENTS 5,955,052 A   9/1999   Padhi et al.
5,961,950 A   10/1999  Dahn et al.
(Continued)

FOREIGN PATENT DOCUMENTS

JP   6-349494 A      12/1994
JP   2000-34127 A    2/2000
(Continued)

OTHER PUBLICATIONS

J. M. Paulsen et al., $O_2$-Type $Li_{2/3}[Ni_{1/3}Mn_{2/3}]O_2$: A New Layered Cathode Material for Rechargeable Lithium Batteries, Journal of the Electrochemical Society, vol. 147, No. 7, Jan. 1, 2000, pp. 2478-2485.

(Continued)

*Primary Examiner* — Mark Kopec
(74) *Attorney, Agent, or Firm* — Foley & Lardner LLP (57) ABSTRACT

An object is to provide a positive electrode active material which can exhibit sufficient cycle characteristics in a non-aqueous electrolyte secondary battery.
The positive electrode active material for a non-aqueous electrolyte secondary battery of the present invention is represented by Composition Formula (2): $Li_x[Ni_{(1/3-a)}[M]_a Mn_{2/3}]O_2$ (in the formula, M represents at least one element selected from the group consisting of Cu, Zn, Mg, Fe, Al, Co, Sc, Ti, V, Cr, Ga, Ge, Bi, Sn, Ca, B, and Zr, $0 \leq a \leq 1/6$, and x represents the number of Li satisfying the atomic valence). In addition, the positive electrode active material for a non-aqueous electrolyte secondary battery is characterized in that it is obtained by reduction-ion exchange of a precursor of the positive electrode active material that is represented by Composition Formula (1): $Na_{2/3}[Ni_{(1/3-a)}[M]_a Mn_{2/3}]O_2$ (in the formula, M and a are as defined in Composition Formula (2)).

2 Claims, 3 Drawing Sheets

(51) Int. Cl.
  *H01M 4/505*    (2010.01)
  *C01G 45/12*    (2006.01)
  *H01M 4/525*    (2010.01)
  *C01G 53/00*    (2006.01)
  *H01M 10/0525*  (2010.01)
  *H01M 4/02*     (2006.01)

(52) U.S. Cl.
  CPC .......... *C01G 53/66* (2013.01); *H01B 1/08* (2013.01); *H01M 4/525* (2013.01); *C01P 2002/72* (2013.01); *C01P 2002/74* (2013.01); *C01P 2004/61* (2013.01); *C01P 2006/40* (2013.01); *H01M 10/0525* (2013.01); *H01M 2004/028* (2013.01); *H01M 2220/20* (2013.01); *Y02E 60/122* (2013.01); *Y02P 70/54* (2015.11)

(56) References Cited

U.S. PATENT DOCUMENTS

| | | | |
|---|---|---|---|
| 6,403,257 B1* | 6/2002 | Christian | C01G 45/02 423/599 |
| 9,083,044 B2 | 7/2015 | Kim et al. | |
| 9,318,740 B2 | 4/2016 | Saito et al. | |
| 2004/0081888 A1 | 4/2004 | Thakeray et al. | |
| 2010/0233542 A1* | 9/2010 | Endo | H01M 4/505 429/223 |
| 2011/0037440 A1 | 2/2011 | Endo et al. | |
| 2012/0282522 A1 | 11/2012 | Axelbaum et al. | |

FOREIGN PATENT DOCUMENTS

| | | |
|---|---|---|
| JP | 2000-123836 A | 4/2000 |
| JP | 2005-100922 A | 4/2005 |
| JP | 2005-259362 A | 9/2005 |
| JP | 2011-228273 A | 11/2011 |
| JP | 2013-535771 A | 9/2013 |
| WO | WO 2009/063838 A1 | 5/2009 |
| WO | WO 2012/151297 A1 | 11/2012 |

OTHER PUBLICATIONS

J. M. Paulsen et al., $O_2$ Structure $Li_{2/3}[Ni_{1/3}Mn_{2/3}]O_2$: A New Layered Cathode Material for Rechargeable Lithium Batteries, Journal of the Electrochemical Society, vol. 147, No. 3, Jan. 1, 2000, pp. 861-868.

J. M. Paulsen et al., $O_2$ Structure $Li_{2/3}[Ni_{1/3}Mn_{2/3}]O_2$: A New Layered Cathode Material for Rechargeable Lithium Batteries, III. Ion Exchange, vol. 147, No. 8, Journal of the Electrochemical Society, Jan. 1, 2000, pp. 2862-2867.

Eun-Sung Lee et al., High-Voltage, High Energy Layered-Spinel Composite Cathodes with Superior Cycle Life for Lithium-Ion Batteries, Chemistry of Materials, vol. 24, No. 3, Feb. 14, 2012, pp. 600-612.

\* cited by examiner

POSITIVE ELECTRODE ACTIVE MATERIAL FOR NON-AQUEOUS ELECTROLYTE SECONDARY BATTERY AND METHOD FOR PRODUCING THE SAME

TECHNICAL FIELD

The present invention relates to a positive electrode active material for a non-aqueous electrolyte secondary battery and a method for producing the same.

BACKGROUND ART

In recent years, from the viewpoint of environmental protection and fuel consumption rate, a hybrid electric vehicle (HEV), an electric vehicle (EV), and also a fuel cell vehicle are produced and sold, and a new development is in also progress. For those so-called electric powered vehicles, use of a power source capable of charge and discharge is essential. As a power source, a secondary battery such as lithium ion battery or nickel hydrogen battery, an electric double layer capacitor or the like is used. In particular, due to high energy density or high durability against repeated charge and discharge, a non-aqueous electrolyte secondary battery such as lithium ion secondary battery is considered suitable for an electric powered vehicle, and thus various developments are actively in progress.

A non-aqueous electrolyte secondary battery aimed to be used for an electric powered vehicle is required to have high output and high capacity. As a positive electrode active material used for a positive electrode of a non-aqueous electrolyte secondary battery, a solid solution positive electrode active material, which contains a transition metal such as lithium and manganese, is known. In particular, manganese is a relatively abundant resource material that can be easily obtained at low cost, and it has a low environmental burden. Thus, it is desirably used for a positive electrode active material.

The solid solution positive electrode active material is known to elute a transition metal (Ni, Mn) of the positive electrode active material to an electrolyte solution during repeated charge and discharge of a battery. Once the transition metal is eluted, the crystal structure of a positive electrode active material changes, and thus there can be a problem of having lower battery capacity due to insufficient absorption of lithium ions.

To prevent the elution of transition metals, a positive electrode active material having composition formula of $xLiMO_2 \cdot (1-x)Li_2M'O_3$ (in the formula, $0<x<1$, M is V, Mn, Fe, Co, or Ni, and M' is Mn, Ti, Zr, Ru, Re, or Pt) is proposed in the Patent Literature 1.

CITATION LIST

Patent Literature

Patent Literature 1: US 2004/0081888 A1

SUMMARY OF INVENTION

Technical Problem

However, even when the technique disclosed in the Patent Literature 1 is used, the elution of transition metals from a positive electrode active material is not sufficiently prevented, and thus the desired cycle characteristics cannot be achieved.

Accordingly, an object of the present invention is to provide a positive electrode active material which can exhibit sufficient cycle characteristics in a non-aqueous electrolyte secondary battery.

Solution to Problem

The inventors of the present invention conducted intensive studies to solve the problems described above. As a result, it was found that the above problems can be solved when a sodium compound as a precursor of a positive electrode active material is converted by reduction-ion exchange to a lithium compound as a positive electrode active material, and the present invention is completed accordingly.

Namely, the positive electrode active material for a non-aqueous electrolyte secondary battery of the present invention is represented by Composition Formula (2): $Li_x[Ni_{(1/3-a)}[M]_a Mn_{2/3}]O_2$ (in the formula, M represents at least one element selected from the group consisting of Cu, Zn, Mg, Fe, Al, Co, Sc, Ti, V, Cr, Ga, Ge, Bi, Sn, Ca, B, and Zr, $0 \leq a \leq 1/6$, and x represents the number of Li satisfying the atomic valence). Furthermore, the positive electrode active material for a non-aqueous electrolyte secondary battery is characterized in that it is obtained by reduction-ion exchange of a precursor of the positive electrode active material that is represented by Composition Formula (1): $Na_{2/3}[Ni_{(1/3-a)}[M]_a Mn_{2/3}]O_2$ (in the formula, M and a are as defined in Composition Formula (2)).

Effect of the Invention

According to the present invention, a sodium compound as a precursor of a positive electrode active material is converted by reduction-ion exchange to a lithium compound as a positive electrode active material, and thus elution of transition metals in the positive electrode active material is suppressed. As a result, it becomes possible for the non-aqueous electrolyte secondary battery to exhibit sufficient cycle characteristics.

DESCRIPTION OF EMBODIMENTS

Hereinbelow, a description will be made of the embodiments of the present invention in view of the drawings. Meanwhile, with regard to the description of drawings, the same elements are given with the same symbols, and overlapped descriptions are omitted. Further, note that dimensional ratios in the drawings are exaggerated for the sake of description, and are different from actual ratios in some cases.

Meanwhile, as described herein, the "positive electrode active material for a non-aqueous electrolyte secondary battery" may also be simply referred to as a "positive electrode active material", the "precursor of a positive electrode active material" may also be simply referred to as a "precursor", and the "non-aqueous electrolyte secondary battery" may also be simply referred to as a "secondary battery" or a "battery".

<Positive Electrode Active Material>

The positive electrode active material for a non-aqueous electrolyte secondary battery according to one embodiment of the present invention is represented by Composition Formula (2): $Li_x[Ni_{(1/3-a)}[M]_aMn_{2/3}]O_2$ (in the formula, M represents at least one element selected from the group consisting of Cu, Zn, Mg, Fe, Al, Co, Sc, Ti, V, Cr, Ga, Ge, Bi, Sn, Ca, B, and Zr, $0 \leq a \leq 1/6$, and x represents the number of Li satisfying the atomic valence). Furthermore, the positive electrode active material for a non-aqueous electrolyte secondary battery is characterized in that it is obtained by reduction-ion exchange of a precursor of the positive electrode active material that is represented by Composition Formula (1): $Na_{2/3}[Ni_{(1/3-a)}[M]_aMn_{2/3}]O_2$ (in the formula, M represents at least one element selected from the group consisting of Cu, Zn, Mg, Fe, Al, Co, Sc, Ti, V, Cr, Ga, Ge, Bi, Sn, Ca, B, and Zr and $0 \leq a \leq 1/6$).

According to this embodiment, the precursor of a positive electrode active material represented by Composition Formula (1) (sodium compound) and the positive electrode active material represented by Composition Formula (2) (lithium compound) are characterized in that they essentially contain Ni and Mn. Preferably, part of the Ni is replaced with a metal (M).

The metal (M) is preferably a metal belonging to Group 2 to Group 15 of Period 2 to Period 6. It is more preferably a metal belonging to Group 2 to Group 14 of Period 2 to Period 4. Specifically, it represents at least one selected from the group consisting of Cu, Zn, Mg, Fe, Al, Co, Sc, Ti, V, Cr, Ga, Ge, Bi, Sn, Ca, B, and Zr. Among them, the metal (M) is preferably at least one selected from the group consisting of Cu, Zn, Mg, Fe, Al and Co, and more preferably at least one selected from the group consisting of Mg, Fe, and Co. It is believed that, as part of the Ni is replaced with the metal (M), elution of Ni or Mn to an electrolyte solution is further suppressed. As a result, the non-aqueous electrolyte secondary battery can exhibit excellent cycle characteristics or excellent discharge capacity and/or discharge characteristics (at the time of high rate, in particular). Meanwhile, the metal (M) in Composition Formula (1) and the metal (M) in Composition Formula (2) represent the same element.

The "a" in Composition Formula (1) and Composition Formula (2) (that is, the ratio of the metal (M) when the total molar ratio of Ni, Mn, and the metal (M) is 1) is $0 \leq a \leq 1/6$, and from the viewpoint of having more effective exhibition of the effect of the metal (M) (that is, effect of suppressing elution of Ni or Mn to an electrolyte solution), it is preferably $1/18 \leq a \leq 1/7$. Meanwhile, the "a" in Composition Formula (1) and the "a" in Composition Formula (2) represent the same value.

The positive electrode active material (lithium compound) of this embodiment is obtained by reduction-ion exchange of a precursor of the positive electrode active material (sodium compound). By reduction-ion exchange, Ni, Mn and/or the metal (M) in the precursor of a positive electrode active material (sodium compound) are reduced so that their atomic valence may change. Thus, in Composition Formula (2), x represents the number of Li satisfying the atomic valence.

The positive electrode active material synthesized by reduction-ion exchange of this embodiment can enhance the battery cycle characteristics in a significant sense when compared to a positive electrode active material which is synthesized by common ion exchange without involving any reduction of transition metals. Furthermore, the positive electrode active material of this embodiment which is synthesized by reduction-ion exchange is excellent also in terms of discharge capacity and/or discharge characteristics of a battery compared to a positive electrode active material which is synthesized by reduction-ion exchange. In particular, as it can exhibit high discharge capacity and/or discharge characteristics at high output (at the time of high rate), the positive electrode active material of this embodiment can be desirably used for a secondary battery for an electric powered vehicle. It is believed that such excellent battery performance is based on suppressed elution of transition metals to an electrolyte solution as caused by reduction-ion exchange of a precursor of a positive electrode active material (sodium compound) with pre-determined composition. As it is assumed by the inventors of the present invention, it is believed that the precursor of a positive electrode active material (sodium compound) is converted by reduction-ion exchange to a positive electrode active material (lithium compound) in conjunction with re-binding of atoms. However, the technical scope of the present invention is not limited by that mechanism.

The crystal structure of the precursor of a positive electrode active material is not particularly limited as long as it has Composition Formula (1). However, it preferably has P2 type structure or P3 type structure that is known in the art as a structure of an AMO type layered compound (A represents a monovalent cation and M represents a transition metal). In addition, the crystal structure of the positive electrode active material is not particularly limited as long as it has Composition Formula (2). However, it preferably has O2 type structure or O3 type structure that is known in the art as a structure of a layered oxide. When a precursor of a positive electrode active material of P2 type structure is subjected to reduction-ion exchange, a positive electrode active material of O2 type structure is obtained, and when a precursor of a positive electrode active material of P3 type structure is subjected to reduction-ion exchange, a positive electrode active material of O3 type structure is obtained. From the viewpoint of having high charge and discharge capacity of a battery, it is more preferable for the positive electrode active material to have the O3 type structure. Thus, accordingly, the precursor of a positive electrode active material preferably has a P3 structure. Meanwhile, with regard to the description of the crystal structure type described above, P represents a triangular prism type (prismatic), O represents an octahedral type (octahedral), and the number represents the period of MO layer in lamination direction.

Figure 1:
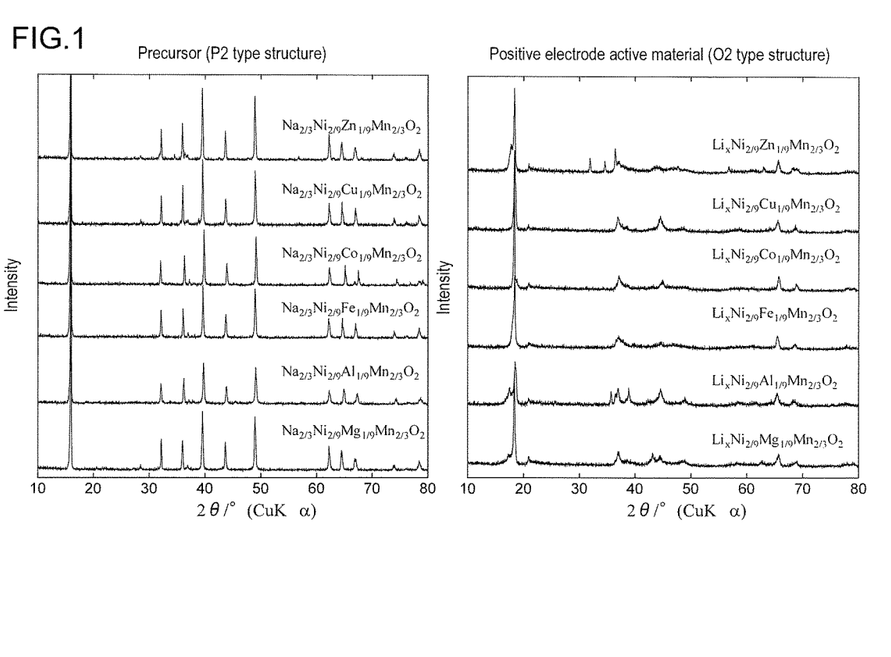
FIG. 1 is a chart illustrating the X-ray diffraction pattern of a positive electrode active material with O2 type structure according to one embodiment of the present invention.

In the positive electrode active material of this embodiment, the positive electrode active material having the O2 type structure has diffraction peaks representing a rock salt type layered structure at 20°-23° (superlattice structure specific to solid solution), 35°-40°, 42°-46°, and 64°-65°/65°-66° according to X-ray diffraction (XRD) measurement as shown in FIG. 1. As described herein, the expression 64°-65°/65°-66° means that there are two contiguous peaks at 64°-65° and 65°-66° and it includes a case in which only one broad peak is shown without clear separation, depending on the composition. In that case, it is preferable to have 3 to 5 diffraction peaks at 35°-40° and 1 to 3 diffraction peaks at 42°-46°.

Meanwhile, it is not necessary that the number of diffraction peaks accords with the above values. As shown in FIG. 1, when a precursor of P2 type structure is converted to a positive electrode active material of O2 type, the diffraction peaks at 32°, and 53° that are observed from a precursor of P2 type structure are lost. As described herein, the X-ray diffraction measurement is performed by the measurement method described in the Examples that are described below.

Figure 2:
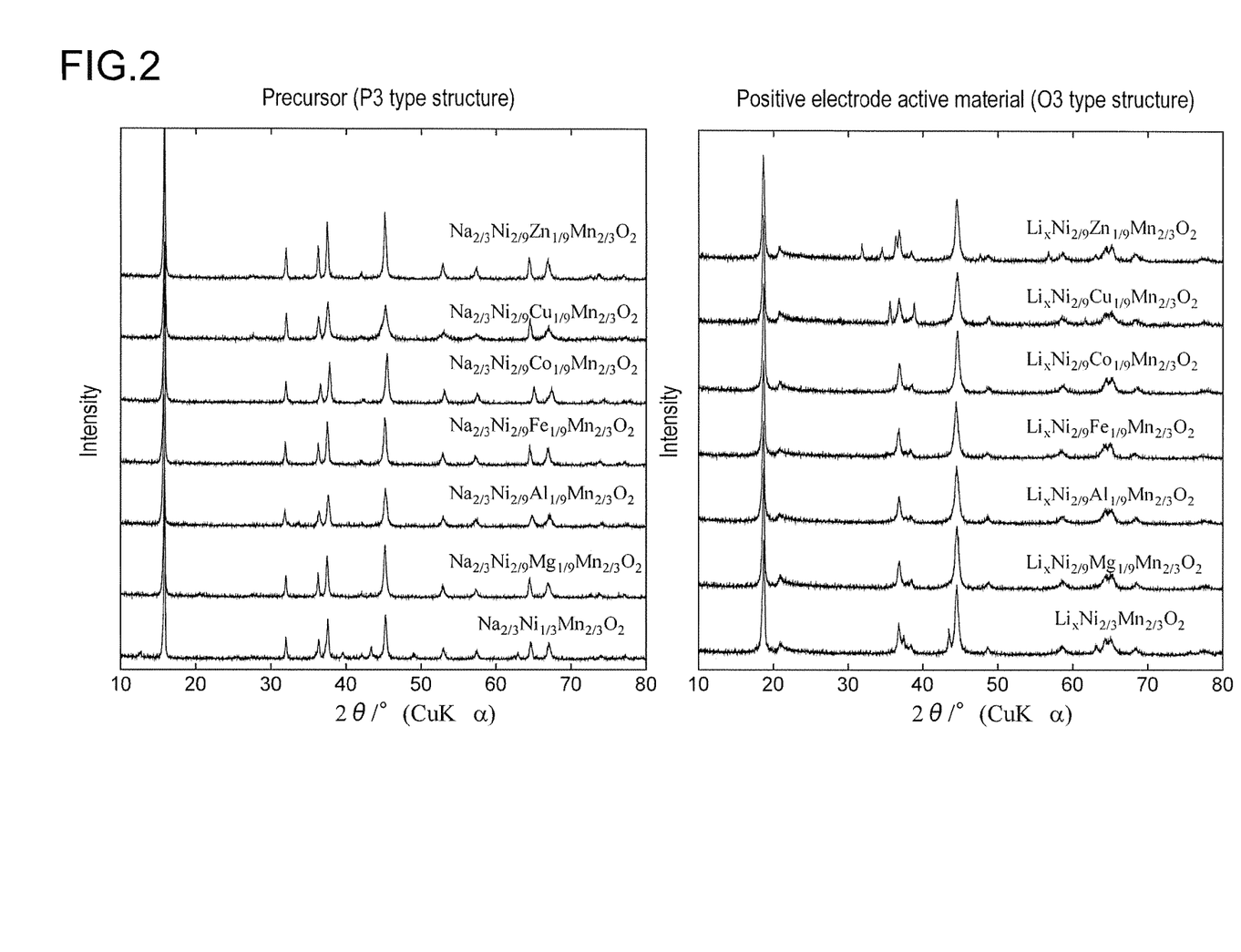
FIG. 2 is a chart illustrating the X-ray diffraction pattern of a positive electrode active material with O3 type structure according to one embodiment of the present invention.

Meanwhile, as shown in FIG. 2, the positive electrode active material with O3 type structure also has peaks of X-ray diffraction (XRD) measurement within the same angle range as the O2 type structure. Specifically, it has diffraction peaks representing a rock salt type layered structure at 20°-23° (superlattice structure specific to solid solution), 35°-40°, 42°-46°, and 64°-65°/65°-66°. In that case, it is preferable to have 3 to 5 diffraction peaks at 35°-40° and 1 to 3 diffraction peaks at 42°-46°. Meanwhile, it is not necessary that the number of diffraction peaks accords with the above values. As shown in FIG. 2, when a precursor of P3 type structure is converted to a positive electrode active material of O3 type, the diffraction peaks at 32°, 39°, and 72°-79° that are observed from a precursor of P3 type structure are lost.

When the X-ray diffraction pattern of the O2 type structure shown in FIG. 1 is compared to the X-ray diffraction pattern of the O3 type structure shown in FIG. 2, it is found that the peak intensity is different. Specifically, the peak intensity ratio of 42°-46° (104) relative to 17°-20° (003) is 0.60 or less in the $O_2$ type structure while the peak intensity ratio is 0.70 or more in the $O_3$ type structure.

Namely, among the positive electrode active materials of this embodiment, the positive electrode active material with O2 type structure can be expressed as follows from other point of view. The positive electrode active material for a non-aqueous electrolyte secondary battery of this embodiment is represented by Composition Formula (2) described above and it has diffraction peaks representing a rock salt type layered structure at 20°-23° (superlattice structure specific to solid solution), 35°-40°, 42°-46°, and 64°-65°/65°-66° in X-ray diffraction measurement in which the peak intensity ratio of 42°-46° (104) relative to 17°-20° (003) is 0.60 or less in the O2 type structure.

Furthermore, among the positive electrode active materials of this embodiment, the positive electrode active material with O3 type structure can be expressed as follows from other point of view. The positive electrode active material for a non-aqueous electrolyte secondary battery of this embodiment is represented by Composition Formula (2) described above and it has diffraction peaks representing a rock salt type layered structure at 20°-23° (superlattice structure specific to solid solution), 35°-40°, 42°-46°, and 64°-65°/65°-66° in X ray diffraction measurement in which the peak intensity ratio of 42°-46° (104) relative to 17°-20° (003) is 0.70 or more.

Among the diffraction peaks of the O2 type structure and O3 type structure that are described above, the diffraction peak at 20°-23° indicates a superlattice diffraction peak which is specific to $Li_2MnO_3$. Furthermore, generally, the diffraction peaks at 36.5°-37.5°, 44°-46°, and 64°-65°/65°-66° are specific to a rock salt type layered structure of $LiMnO_2$. Furthermore, in this embodiment, it is preferable to have 3 diffraction peaks at 35°-40° and 1 diffraction peak at 42°-46° as part of the diffraction peaks representing the rock salt type layered structure. It is also preferable that the positive electrode active material of this embodiment does not contain a material which shows a peak other than the diffraction peaks representing the rock salt type layered structure, for example, a peak derived from impurities or the like, within these angle ranges. Specifically, it is preferable that it does not substantially contain a peak which is observed from a precursor of P2 type structure or P3 type structure described above. When other peak is present, it means that a structure other than a rock salt type layered structure is included in the positive electrode active material. As a structure other than a rock salt type layered structure is not included, the effect of enhancing the cycle characteristics of the battery can be more surely obtained.

The average particle diameter of the positive electrode active material is preferably 10 μm to 20 μm, and more preferably 12 μm to 18 μm. When the average particle diameter is 10 μm or more, elution of manganese can be suppressed. On the other hand, when the average particle diameter is 20 μm or less, breaking of a film or clogging can be suppressed during a process of coating a slurry containing the positive electrode active material on a current collector for producing a positive electrode. Meanwhile, as for the average particle diameter, the diameter measured by particle size distribution analyzer based on laser diffraction-scattering is used. The average particle diameter can be measured by using a particle size distribution analyzer (Model: LA-920) manufactured by HORIBA, Ltd., for example.

<Method for Producing Positive Electrode Active Material>

Hereinbelow, a method for producing the positive electrode active material for a non-aqueous electrolyte secondary battery of this embodiment is described. The positive electrode active material of this embodiment is characterized in that the precursor of a positive electrode active material represented by Composition Formula (1) is converted to a compound represented by Composition Formula (2) by reduction-ion exchange.

In this embodiment, the method for preparing the precursor of a positive electrode active material (sodium compound) is not particularly limited, and a known method for synthesizing oxides of transition metal can be suitably adopted. Examples thereof include a solid phase process such as solid phase reaction method or molten salt method, and a liquid phase process such as sol-gel method, co-precipitation method, or spray dry method.

As an example, a method for preparing a precursor of a positive electrode active material based on a molten salt method is described. According to a molten salt method, powder of metal compound as a raw material is mixed first to have desired composition, dissolved in a solvent by heating, and then subjected to a thermal degradation. After that, the obtained solid is pulverized and calcined, and thus the synthesis is completed.

The metal compound as a raw material is not particularly limited, but examples thereof include a nitrate, a sulfate, a carbonate, a phosphate, an acetate, a hydroxide, a halide (for example, chloride) or the like of each of Na, Ni, Mn, and the metal (M). Among them, from the viewpoint of a post-treatment of a synthesized precursor, it is preferable to use a nitrate of each of Na, Ni, Mn, and the metal (M).

The solvent used for dissolution by heating is not particularly limited, but it is preferably a solvent with a boiling point of 150° C. to 250° C. or so. For example, triethylene glycol (boiling point: 197.3° C.), propylene glycol (boiling point: 188.2° C.), diethylene glycol (boiling point: 244.3° C.), or the like are preferably used.

Temperature for dissolution by heating is suitably determined depending on the metal compound as a raw material and a solvent for use. For example, when a nitrate of each metal is used as a metal compound and triethylene glycol is used as a solvent, the dissolution by heating is preferably performed at a temperature of 100° C. to 200° C. or so. The metal compound starts to melt around 100° C. It is preferable that the dissolution of a metal compound is performed by gradually increasing the temperature to 200° C. or so after that. At that time, NOx gas is generated and a viscosity of the solution increases slowly.

After that, thermal degradation is performed by further heating a mixture which is obtained by dissolution by heating. The temperature for thermal degradation is not particularly limited. However, when a nitrate of each metal is used as a metal compound, it is preferable to perform the thermal degradation at a temperature of 300° C. to 400° C. or so, and the reaction proceeds with generation of NOx. When the reaction is completed, a reaction product in a solid state is obtained.

If necessary, the obtained reaction product in a solid state is preferably pulverized to have a desired particle size. The method for pulverization is not particularly limited, and a known means using a ball mill, a pestle and mortar pulverization, a planetary ball mill, or the like can be used.

Thereafter, the obtained reaction product is calcined. The calcination temperature is preferably in the range of 650° C. to 1000° C. For a precursor with P2 type structure, it is more preferably in the range of 850° C. to 1000° C. For a precursor with P3 type structure, it is more preferably in the range of 650° C. to 800° C. The calcination time is generally in the range of 6 to 48 hours. Accordingly, a precursor of a positive electrode active material (sodium compound) with layered structure is obtained.

As another method for preparing a precursor of a positive electrode active material, a co-precipitation method is described. The co-precipitation method is a method for precipitating and depositing a plurality of metal ions as a hardly soluble salt (for example, hydroxide, carbonate, oxalate, and sulfate) by adding a precipitating agent to a solution containing several kinds of target metal ions and adjusting the ion concentration in the solution to be higher than the solubility product to yield a super saturation state.

For example, by adding $Na_2CO_3$ as a precipitating agent and L-ascorbic acid as a reducing agent to an aqueous solution containing Ni ions, Mn ions, and ions of the metal (M), precipitates (carbonate hydroxide) are formed. The precipitates are washed with water to remove excess Na followed by drying and pre-calcination. It is preferable that the temperature of pre-calcination is 600° C. or lower, and preferably in the range of 350° C. to 500° C. Time for pre-calcination is generally in the range of 2 to 24 hours. Similar to the molten salt method described above, the obtained solid product may be pulverized to have a desired particle size, if necessary. After that, the obtained reaction product is subjected to main calcination. The main calcination is carried out at the same conditions as those of the molten salt method described above. Accordingly, a precursor of a positive electrode active material (sodium compound) with layered structure is obtained.

Subsequently, descriptions are given for a method for converting a sodium compound as a precursor of a positive electrode active material to a lithium compound as a positive electrode active material by reduction-ion exchange. Meanwhile, the reduction-ion exchange means ion exchange of sodium ions with lithium ions while reducing the metal (Ni, Mn, M) in a precursor.

Specific examples of a method for reduction-ion exchange include a method of heating a precursor together with a lithium compound and a reducing agent. The lithium compound used for the method is not particularly limited, and examples thereof include lithium nitrate, lithium acetate, and lithium sulfate. The lithium compound is preferably used in a Li molar amount that is 2 to 20 times the Na molar amount in the precursor.

Furthermore, examples of the reducing agent include lithium iodide (LiI) and lithium bromide (LiBr), although it is not particularly limited. The reducing agent is preferably used $\frac{1}{20}$ to $\frac{1}{5}$ times the molar concentration of a lithium compound.

Meanwhile, the reaction temperature for reduction-ion exchange is preferably in the range of 200° C. to 350° C., and the reaction time is 4 to 48 hours or so. By removing excess alkali metal salts by washing with water after the completion of the reaction, a positive electrode active material (lithium compound) represented by Composition Formula (1) is obtained.

<Non-Aqueous Electrolyte Secondary Battery>

When applied to a non-aqueous electrolyte secondary battery, the aforementioned positive electrode active material can enhance the cycle characteristics of a battery. Hereinbelow, by having a lithium ion secondary battery as an example, descriptions are given in view of the drawings for a non-aqueous electrolyte secondary battery to which the positive electrode active material of this embodiment can be applied.

Figure 3:
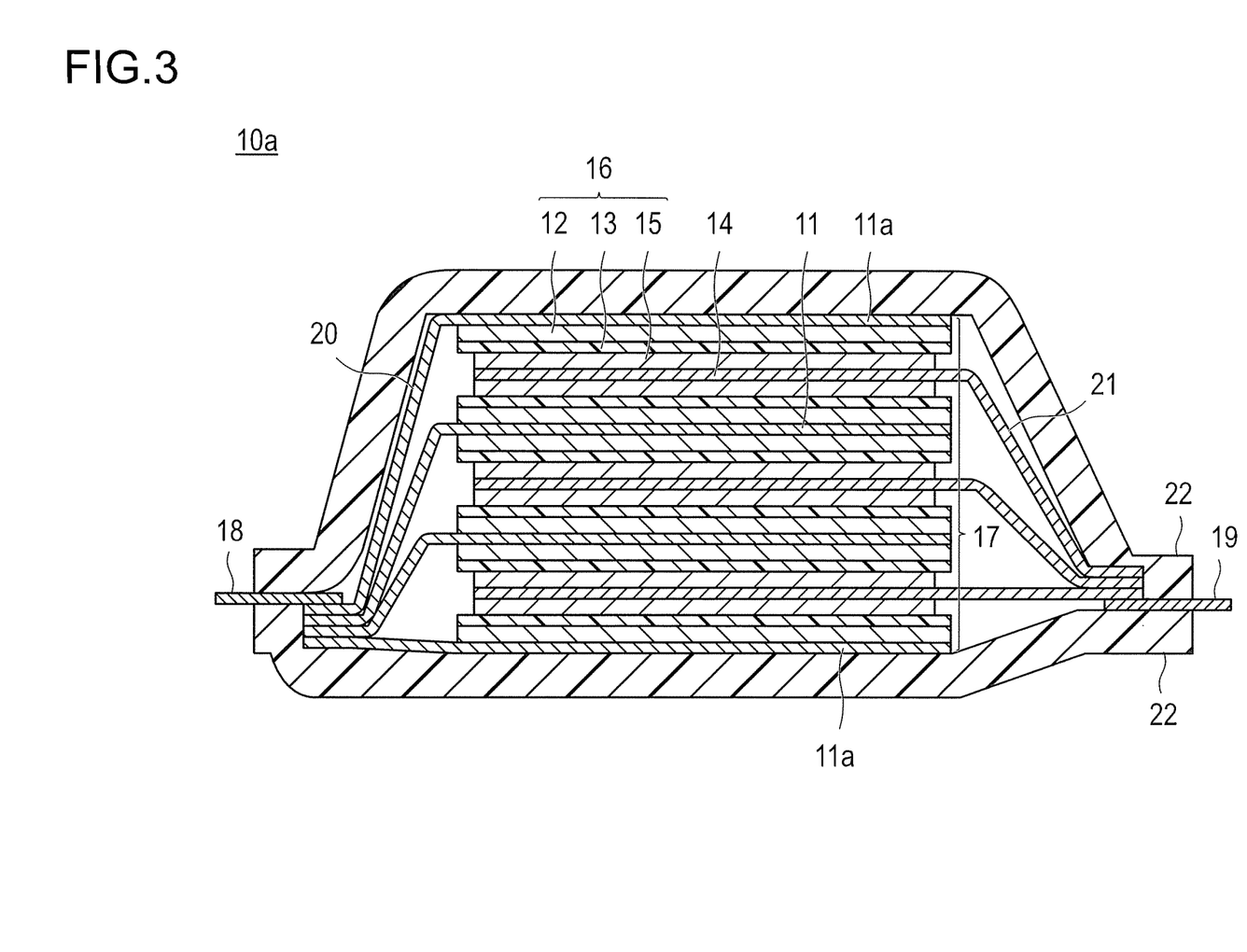
FIG. 3 is a brief cross-sectional view illustrating diagrammatically the overall structure of a lithium ion secondary battery, in which lamination is made in parallel, according to one embodiment of the present invention.

FIG. 3 is a brief cross-sectional view illustrating diagrammatically the overall structure of a lithium ion secondary battery according to one embodiment of the present invention, in which lamination is made in parallel (hereinbelow, it is also simply referred to as a "parallel laminated type battery"). As shown in FIG. 3, a parallel laminated type battery 10a of this embodiment has a structure in which an approximately rectangular power generating element 17, in which a charge and discharge reaction actually occurs, is sealed inside a laminate film 22 as a battery outer casing material. More specifically, it has a constitution in which a power generating element 17 is encased and sealed using a polymer-metal composite laminate film as a battery outer casing material and the entire periphery thereof is fused by heat.

The power generating element 17 has a constitution in which a negative electrode having a negative electrode active material layer 12 disposed on both surfaces (for the bottommost layer and the uppermost layer of a power generating element, only on one surface) of a negative electrode current collector 11, an electrolyte layer 13, and a positive electrode having a positive electrode active material layer 15 disposed on both surfaces of a positive electrode current collector 14 are laminated. Specifically, one negative electrode active material layer 12 and a positive electrode active material layer 15 adjacent to the negative electrode active material layer 12 are disposed to face each other via an electrolyte layer 13, and the negative electrode, the electrolyte layer 13, and the positive electrode are laminated in this order. For the positive electrode active material layer, a positive electrode active material with specific composition and structure is used as described below.

Accordingly, the adjacent negative electrode, the electrolyte layer 13, and the positive electrode form one single battery layer 16. Thus, it can be said that a parallel laminated type battery 10 of this embodiment has a constitution in which a plurality of the single battery layer 16 are laminated and electrically connected in parallel to each other. In addition, on outer periphery of the single battery layer 16, a seal part (insulating layer) for having insulation between the neighboring negative electrode current collector 11 and the positive electrode current collector 14 can be formed (not illustrated). On the outermost layer negative electrode current collector 11a present on both outermost layers of the power generating element 17, the negative electrode active material layer 12 is disposed only on one surface of them.

Meanwhile, it is also possible that, by reversing the arrangement of the negative electrode and the positive electrode of FIG. 3, the outermost layer positive electrode current collector is present on both outermost layers of the power generating element 17 while the positive electrode active material layer is disposed only on one surface of the outermost layer positive electrode current collector.

The negative electrode current collector 11 and the positive electrode current collector 14 have a structure in which a negative electrode current collecting plate 18 and a positive electrode current collecting plate 19, respectively, which conductively communicate with each electrode (positive electrode and negative electrode), are attached and inserted to the end part of the laminate film 22 so as to be led to the outside of the laminate film 22. As necessary, each of the negative electrode current collecting plate 18 and the positive electrode current collecting plate 19 can be attached by ultrasonic welding or resistance welding, via a negative electrode terminal lead 20 and a positive electrode terminal lead 21, to the negative electrode current collector 11 and the positive electrode current collector 14 of each electrode (this mode is shown in FIG. 3). Meanwhile, it is also possible that the negative electrode current collector 11 is extended to be the negative electrode current collecting plate 18 and led from the laminate film 22 to the outside. Similarly, it is also possible to have a structure in which the positive electrode current collector 14 is extended to be the positive electrode current collecting plate 19 and led from the battery outer casing material 22 to the outside.

Meanwhile, although descriptions are given herein by having a parallel laminated type battery as an example, the type of a non-aqueous electrolyte secondary battery for which the positive electrode active material of this embodiment can be applied is not particularly limited, and it can also be applied to any known non-aqueous electrolyte secondary battery in the art such as so-called bipolar type battery in which single battery layers are connected in series in a power generating element. Hereinbelow, detailed descriptions are given for a main constitutional element of a parallel laminated type battery.

[Positive Electrode]

The positive electrode has a function of generating, together with a negative electrode, electric energy according to transport of lithium ions. The positive electrode essentially has a current collector and a positive electrode active material layer, and the positive electrode has a positive electrode active material layer formed on a surface of a current collector.

(Current Collector)

The current collector consists of a conductive material, and on one or both surface of the current collector, a positive electrode active material layer is disposed. The material for forming a current collector is not particularly limited, but a metal, a conductive polymer material, or a conductive resin in which a conductive filler is added to a non-conductive polymer material can be used.

Specific examples of the metal include aluminum, nickel, iron, stainless steel (SUS), titanium, and copper. In addition to them, a clad material of nickel and aluminum, a clad material of copper and aluminum, or a plating material of a combination of those metals can be preferably used. It can also be a foil obtained by coating aluminum on a metal surface. Among them, from the viewpoint of conductivity or potential for operating a battery, aluminum, stainless steel, and copper are preferable.

Examples of the conductive polymer material include polyaniline, polypyrrole, polythiophene, polyacetylene, polyparaphenylene, polyphenylenevinylene, polyacrylonitrile, polyoxadiazole and the like. These conductive polymer materials have sufficient conductivity even if a conductive filler is not added, and therefore, they are advantageous in terms of facilitating manufacturing process or of reducing weight of the current collector.

Examples of the non-conductive polymer material include polyethylene (PE; high density polyethylene (HDPE), low density polyethylene (LDPE) etc.), polypropylene (PP), polyethylene terephthalate (PET), polyethernitrile (PEN), polyimide (PI), polyamideimide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), polystyrene (PS) and the like. Such non-conductive polymer materials may have excellent voltage resistance or solvent resistance.

To the above-mentioned conductive polymer materials or to the non-conductive polymer materials, if necessary, a conductive filler can be added. In particular, when a resin to be a base material of the current collector consists only of a non-conductive polymer, a conductive filler is necessarily indispensable in order to give conductivity to the resin. As the conductive filler, any material can be used if it has conductivity, without particular limitation. For example, as a material excellent in conductivity, potential resistance, or lithium ion shielding characteristics, a metal, a conductive carbon or the like can be mentioned. As the metal, although there is no particular limitation, it is preferable to contain at least one metal selected from the group consisting of Ni, Ti, Al, Cu, Pt, Fe, Cr, Sn, Zn, In, Sb and K, or an alloy or metal oxide containing these metals. Further, as the conductive carbon, although there is no particular limitation, it is preferable to contain at least one selected from the group consisting of acetylene black, VULCAN, BLACK PEARLS, carbon nanofiber, Ketjen black, carbon nanotube, carbon nanohorn, carbon nanobaloon and fullerene. The addition amount of the conductive filler is not particularly limited, if it can give sufficient conductivity to the current collector, and generally, it is around 5% by mass to 35% by mass.

The size of a current collector is determined based on the specific use of a battery. When it is used for a battery with large size which is required to have high energy density, a current collector with large area is used. The thickness of a current collector is not particularly limited, either. However, it is generally around 1 μm to 100 μm.

(Positive Electrode Active Material Layer)

The positive electrode active material layer essentially contains the aforementioned positive electrode active material, and it may further contain other positive electrode active material or an additive such as conductive aid and binder in addition to the above positive electrode active material.

The conductive aid indicates an additive which is blended to enhance the conductivity of an active material layer. By containing a conductive material in a positive electrode active material layer, an electron network is effectively formed in a positive electrode active material layer so that the output characteristics of a battery can be improved.

Examples of the conductive aid include carbon powder such as acetylene black, carbon black, channel black, thermal black, Ketjen black, or graphite, various carbon fibers such as vapor grown carbon fiber (VGCF: registered trademark), and expanded graphite.

Content of the conductive aid relative to the total amount of the positive electrode active material layer is generally 0% by mass to 30% by mass, preferably 1% by mass to 10% by mass, and more preferably 3% by mass to 7% by mass.

The binder is added for the purpose of maintaining an electrode structure by binding constitutional members in an active material layer or binding an active material layer and a current collector.

The binder is not particularly limited, and examples thereof include polyvinylidene fluoride (PVdF), carboxymethyl cellulose (CMC), polytetrafluoroethylene (PTFE), polyvinyl acetate, an acrylic resin, polyimide, an epoxy resin, a polyurethane resin, a urea resin, and a synthetic rubber-based binder such as styrene-butadiene rubber (SBR).

Content of the binder relative to the total amount of the positive electrode active material layer is generally 0% by mass to 50% by mass, preferably 5% by mass to 45% by mass, more preferably 10% by mass to 25% by mass, and particularly preferably 15% by mass to 20% by mass.

[Negative Electrode]

The negative electrode has a function of generating, together with a positive electrode, electric energy according to transport of lithium ions. The negative electrode essentially has a current collector and a negative electrode active material layer, and the negative electrode has a negative electrode active material layer formed on a surface of a current collector.

(Current Collector)

The current collector which can be used for a negative electrode is the same as the current collector used for a positive electrode. Thus, no further descriptions are given here.

(Negative Electrode Active Material Layer)

The negative electrode active material layer contains a negative electrode active material. The negative electrode active material layer may further contain an additive such as conductive aid and binder.

The negative electrode active material has composition which can release lithium ions during discharge and absorb lithium ions during charge. The negative electrode active material is not particularly limited, if it is capable of reversible absorption and release of lithium. Preferred examples of the negative electrode active material include metal such as Si and Sn, metal oxide such as TiO, $Ti_2O_3$, $TiO_2$, or $SiO_2$, SiO, $SnO_2$, a composite oxide of lithium and transition metal such as $Li_{4/3}Ti_{5/3}O_4$ or $Li_7MnN$, a Li—Pb based alloy, a Li—Al based alloy, Li, and carbon material such as carbon powder, natural graphite, artificial graphite, carbon black, activated carbon, carbon fiber, cokes, soft carbon, or hard carbon. Among them, by using an element which can form an alloy with lithium, a battery having higher energy density, with high capacity and excellent output characteristics than a conventional carbon material can be obtained. The negative electrode active material may be used either singly or as a mixture of two or more kinds. Specific examples of the element which can form an alloy with lithium include Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te, and Cl, although it is not limited to them.

Among the negative electrode active materials described above, it is preferable to contain a carbon material and/or at least one element selected from the group consisting of Si, Ge, Sn, Pb, Al, In, and Zn. It is more preferable to contain a carbon material, or an element of Si or Sn. It is particularly preferable to use a carbon material.

As for the carbon material, a carbonaceous particle with lower discharge potential than lithium is preferable. For example, natural graphite, artificial graphite, a blend of natural graphite and artificial graphite, a material obtained by coating natural graphite with non-crystalline carbon, soft carbon, hard carbon, or the like can be used. Shape of the carbonaceous particle is not particularly limited, and it may be any shape of bulk shape, globular shape, and fiber shape. However, it is preferably not a flake shape, and it is preferably a globular shape or a bulk shape. Not having a flake shape is preferred from the viewpoint of performance and durability.

Furthermore, surface of the carbonaceous particle is preferably coated with non-crystalline carbon. In that case, it is more preferable that the entire surface of the carbonaceous particle is coated with non-crystalline carbon, but it is also possible that only part of the surface is coated. As the surface of carbonaceous particle is coated with non-crystalline carbon, a reaction between graphite and electrolyte solution during charge and discharge of the battery can be prevented. Method for coating a surface of graphite particle with non-crystalline carbon is not particularly limited. For example, a wet method in which carbonaceous particles (powder) to be a nucleus are dispersed or mixed in a mixture solution having non-crystalline carbon dissolved or dispersed in a solvent followed by removal of the solvent can be mentioned. Furthermore, there is a dry method in which carbonaceous particles and non-crystalline carbon are admixed with each other in solid state and coating with non-crystalline carbon is performed by applying dynamic energy to the mixture, and a gas phase method such as CVD method. Coating of carbonaceous particles with non-crystalline carbon can be confirmed by a method of laser spectroscopy or the like.

The BET specific surface area of the negative electrode active material is preferably 0.8 $m^2/g$ to 1.5 $m^2/g$. As the specific surface area is within this range, the cycle characteristics of a non-aqueous electrolyte secondary battery can be improved. Furthermore, the tap density of the negative electrode active material is preferably 0.9 $g/cm^3$ to 1.2 $g/cm^3$. The tap density within this range is preferable from the viewpoint of energy density.

The average particle diameter of the negative electrode active material is not particularly limited. However, from the viewpoint of having high capacity, reactivity, and cycle durability of a negative electrode active material, it is preferably 1 μm to 100 μm, and more preferably 1 μm to 20 μm.

Meanwhile, the conductive aid and binder which can be used for a negative electrode are the same as those used for a positive electrode, and thus no further descriptions are given here.

[Electrolyte Layer]

The electrolyte layer functions as a spatial partition (spacer) between a positive electrode and a negative electrode. In addition, it also has a function of maintaining an electrolyte as a transport medium for lithium ions between a positive electrode and a negative electrode during charge and discharge. The electrolyte for constituting an electrolyte layer is not particularly limited, and a liquid electrolyte, and a polymer electrolyte such as polymer gel electrolyte or polymer solid electrolyte can be suitably used. In this embodiment, a liquid electrolyte is preferable.

The liquid electrolyte has a form in which a lithium salt is dissolved in an organic solvent. Examples of the organic solvent include at least one of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), fluorine-containing cyclic carbonate (fluoroethylene carbonate (FEC) or the like), fluorine-containing chain carbonate, fluorine-containing chain ether, and fluorine-containing chain ester.

As a lithium salt, it is preferable to use at least $LiPF_6$. In addition to this, $LiN(SO_2C_2F_5)_2$, $LiN(SO_2CF_3)_2$, $LiBF_4$, $LiClO_4$, $LiAsF_6$, $LiSO_3CF_3$, or the like can also be used. Lithium salt concentration is preferably 0.1 mol/L to 5 mol/L and more preferably 0.1 mol/L to 2 mol/L.

Furthermore, in case of a liquid electrolyte, it is preferable to contain, as an additive, at least one of an organic sulfone compound, an organic disulfone compound, a vinylene carbonate derivative, an ethylene carbonate derivative, an ester derivative, a divalent phenol derivative, a terphenyl derivative, a phosphate derivative, and a lithium fluorophosphate derivative. Among them, a lithium fluorophosphate derivative such as lithium monofluorophosphate and lithium difluorophosphate is preferable. Use of the additive is preferred from the viewpoint or performance and lifetime characteristics. The additive is contained preferably at 0.1% by mass to 5% by mass, and more preferably at 0.5% by mass to 3.5% by mass in an electrolyte solution.

Meanwhile, the polymer electrolyte is classified into a gel electrolyte containing an electrolyte solution and a polymer solid electrolyte not containing an electrolyte solution.

The gel electrolyte has a constitution in which the aforementioned liquid electrolyte is injected to a matrix polymer with lithium ion conductivity. Examples of the matrix polymer with lithium ion conductivity include polyethylene oxide (PEO), polypropylene oxide (PPO), and a copolymer thereof. An electrolyte salt such as lithium salt can be dissolved well in those matrix polymers.

Meanwhile, when the electrolyte layer contains a liquid electrolyte or a gel electrolyte, a separator may be used in an electrolyte layer. Specific examples of the separator include a microporous membrane formed of polyolefin such as polyethylene and polypropylene, hydrocarbons such as polyvinylidene fluoride-hexafluoropropylene (PVdF-HFP), glass fiber or the like.

The polymer solid electrolyte has a constitution in which lithium salts are dissolved in the aforementioned matrix polymer and it does not contain an organic solvent. Thus, when the electrolyte layer consists of a polymer solid electrolyte, there is no possibility of having liquid leakage from a battery, and thus reliability of a battery can be improved.

The matrix polymer of the polymer gel electrolyte or the polymer solid electrolyte can exhibit excellent mechanical strength as it forms a cross-linked structure. For forming a cross-linked structure, a polymerization treatment such as thermal polymerization, UV ray polymerization, radiation polymerization, or electron beam polymerization can be performed for a polymerizable polymer for forming a polymer electrolyte (for example, PEO or PPO) with use of a suitable polymerization initiator. Meanwhile, the electrolyte may also be contained in an active material layer of an electrode.

[Current Collecting Plate (Tab)]

In a lithium ion secondary battery, a current collecting plate (tab) electrically connected to a current collector is led to the outside of a laminate film as an outer casing material for the purpose of extracting electric current to the outside of a battery.

The material for forming the current collecting plate is not particularly limited, and a known highly conductive material which has been conventionally used for a current collecting plate for a lithium ion secondary battery can be used. Preferred examples of the material for forming a current collecting plate include metal materials such as aluminum, copper, titanium, nickel, stainless steel (SUS) and an alloy thereof. From the viewpoint of light weightiness, resistance to corrosion, and high conductivity, aluminum and copper are more preferable, and aluminum is particularly preferable. Meanwhile, the same material or a different material can be used for the positive electrode current collecting plate (positive electrode tab) and the negative electrode current collecting plate (negative electrode tab).

[Positive Electrode Terminal Lead and Negative Electrode Terminal Lead]

The same lead used for a lithium ion secondary battery of known in the art can also be used as a material for a positive electrode terminal lead and a negative electrode terminal lead. Meanwhile, a portion led from a battery outer casing material is preferably coated with a heat resistant and insulating thermal shrinkage tube or the like so that it has no influence on a product (for example, an automobile component, in particular, an electronic device or the like) according to leakage of electricity due to contact with neighboring instruments or wirings.

[Outer Casing Material; Laminate Film]

As an outer casing material, a conventionally known metal can casing can be used. In addition, it is also possible that a power generating element 17 is packaged by using a laminate film 22 as an outer casing material as shown in FIG. 3. For example, the laminate film can be prepared to have a three-layer structure formed by laminating polypropylene, aluminum and nylon in this order. By using this laminate film, opening of an outer casing material, addition of a material for capacity restoration, and re-sealing of an outer casing material can be easily performed.

By using a positive electrode active material of this embodiment, a non-aqueous electrolyte secondary battery such as the aforementioned lithium ion secondary battery can exhibit excellent cycle characteristics. Furthermore, the battery is excellent in terms of discharge capacity and/or discharge characteristics (at the time of high rate, in particular). As such, a non-aqueous electrolyte secondary battery to which the positive electrode active material of this embodiment is applied is preferred as a power source device of an electric powered vehicle.

EXAMPLES

Hereinbelow, the present invention is described in detail in view of Examples, but the present invention is not limited to the Examples given below.

Example 1

(Preparation of P3 Type $Na_{2/3}Ni_{1/3}Mn_{2/3}O_2$; Molten Salt Method)

To 29.08 g of nickel nitrate hexahydrate ($Ni(NO_3)_2 \cdot 6H_2O$ 290.79 g/mol), 57.41 g of manganese nitrate hexahydrate ($Mn(NO_3)_2 \cdot 6H_2O$ 287.04 g/mol) and 17.00 g of sodium nitrate ($NaNO_3$ 84.99 g/mol), 30 g of triethylene glycol ($C_6H_{14}O_4$ 150.2 g/mol) was added. Upon heating, the mixture starts to melt around 100° C. With thorough stirring, it was slowly heated to around 200° C. During the heating, $NO_x$ gas was generated to yield foaming, and the viscosity of the solution has increased. As the heating was further continued, the reaction proceeded with generation of gas, and a precursor was obtained. The obtained precursor was pulverized with a planetary mill (400 rpm, for 20 minutes).

The pulverized precursor was calcined for 10 hours at 700° C. to obtain a precursor of a positive electrode active material.

(Preparation of O3 Type $Li_xNi_{1/3}Mn_{2/3}O_2$)

30 g of the above precursor, 137.892 g of lithium nitrate ($LiNO_3$ 68.946 g/mol), and 26.77 g of lithium iodide (LiI 133.85 g/mol) were added to an aluminum crucible. After increasing the temperature to 280° C. over 3 hours, it was kept at 280° C. for 10 hours. The excess alkali metal salt was removed with hot water to obtain a positive electrode active material.

Example 2

(Preparation of P3 Type $Na_{2/3}Ni_{1/3}Mn_{2/3}O_2$; Co-Precipitation Method)

To 26.28 g of nickel sulfate hexahydrate ($NiSO_4.6H_2O$ 262.85 g/mol) and 48.22 g of manganese sulfate pentahydrate ($MnSO_4.5H_2O$ 241.08 g/mol), 250 ml of pure water was added followed by stirring and dissolution (S1). To 26.50 g of sodium carbonate ($Na_2CO_3$ 105.9884 g/mol), 250 ml of pure water was added followed by stirring and dissolution (S2). To 250 ml of pure water, 4 g of L-ascorbic acid was added and then heated to 50° C. under stirring with purge of carbon dioxide gas. To the resultant, each of (S1) and (S2) was added dropwise at rate of 1 ml/minute to form precipitates. When the dropwise addition is completed, it was maintained for 6 hours at 50° C. under stirring. The suspension was filtered by suction to obtain precipitates, and then excess Na was washed with 3000 ml of pure water. After drying for 12 hours at 100° C., pre-calcination for 12 hours at 450° C. was performed, and a precursor was obtained. The obtained precursor was pulverized with a planetary mill (400 rpm, for 20 minutes). The pulverized precursor was calcined for 10 hours at 700° C. to obtain a precursor of a positive electrode active material.

(Preparation of O3 Type $Li_xNi_{1/3}Mn_{2/3}O_2$)

30 g of the above precursor, 137.892 g of lithium nitrate ($LiNO_3$ 68.946 g/mol), and 26.77 g of lithium iodide (LiI 133.845 g/mol) were added to an aluminum crucible. After increasing the temperature to 280° C. over 3 hours, it was kept at 280° C. for 10 hours. The excess alkali metal salt was removed with hot water to obtain a positive electrode active material.

Example 3

(Preparation of P3 Type $Na_{2/3}Ni_{2/9}Zn_{1/9}Mn_{2/3}O_2$; Molten Salt Method)

To 19.39 g of nickel nitrate hexahydrate ($Ni(NO_3)_2.6H_2O$ 290.79 g/mol), 9.92 g of zinc nitrate hexahydrate ($Zn(NO_3)_2.6H_2O$ 297.49 g/mol), 57.41 g of manganese nitrate hexahydrate ($Mn(NO_3)_2.6H_2O$ 287.04 g/mol) and 17.00 g of sodium nitrate ($NaNO_3$ 84.99 g/mol), 30 g of triethylene glycol ($C_6H_{14}O_4$ 150.2 g/mol) was added. Upon heating, the mixture starts to melt around 100° C. With thorough stirring, it was slowly heated to around 200° C. During the heating, $NO_x$ gas was generated to yield foaming, and the viscosity of the solution has increased. As the heating was further continued, the reaction proceeded with generation of gas, and a precursor was obtained. The obtained precursor was pulverized with a planetary mill (400 rpm, for 20 minutes). The pulverized precursor was calcined for 10 hours at 700° C. to obtain a precursor of a positive electrode active material.

(Preparation of O3 Type $Li_xNi_{2/9}Zn_{1/9}Mn_{2/3}O_2$)

30 g of the above precursor, 137.892 g of lithium nitrate ($LiNO_3$ 68.946 g/mol), and 26.77 g of lithium iodide (LiI 133.845 g/mol) were added to an aluminum crucible. After increasing the temperature to 280° C. over 3 hours, it was kept at 280° C. for 10 hours. The excess alkali metal salt was removed with hot water to obtain a positive electrode active material.

Example 4

A positive electrode active material (O3 type $Li_xNi_{2/9}Cu_{1/9}Mn_{2/3}O_2$) was obtained in the same manner as Example 3 except that copper nitrate trihydrate ($Cu(NO_3)_2.3H_2O$ 241.60 g/mol) was used instead of zinc nitrate hexahydrate.

Example 5

A positive electrode active material (O3 type $Li_xNi_{2/9}Co_{1/9}Mn_{2/3}O_2$) was obtained in the same manner as Example 3 except that copper nitrate trihydrate ($Co(NO_3)_2.6H_2O$ 291.03 g/mol) was used instead of zinc nitrate hexahydrate.

Example 6

A positive electrode active material (O3 type $Li_xNi_{2/9}Fe_{1/9}Mn_{2/3}O_2$) was obtained in the same manner as Example 3 except that copper nitrate trihydrate ($Fe(NO_3)_2.6H_2O$ 287.95 g/mol) was used instead of zinc nitrate hexahydrate.

Example 7

A positive electrode active material (O3 type $Li_xNi_{2/9}Al_{1/9}Mn_{2/3}O_2$) was obtained in the same manner as Example 3 except that aluminum nitrate nonahydrate ($Al(NO_3)_3.9H_2O$ 375.13 g/mol) was used instead of zinc nitrate hexahydrate.

Example 8

A positive electrode active material (O3 type $Li_xNi_{2/9}Mg_{1/9}Mn_{2/3}O_2$) was obtained in the same manner as Example 3 except that magnesium nitrate hexahydrate ($Mg(NO_3)_2.3H_2O$ 256.41 g/mol) was used instead of zinc nitrate hexahydrate.

Example 9

(Preparation of P2 Type $Na_{2/3}Ni_{1/3}Mn_{2/3}O_2$; Molten Salt Method)

To 29.08 g of nickel nitrate hexahydrate ($Ni(NO_3)_2.6H_2O$ 290.79 g/mol), 57.41 g of manganese nitrate hexahydrate ($Mn(NO_3)_2.6H_2O$ 287.04 g/mol) and 17.00 g of sodium nitrate ($NaNO_3$ 84.99 g/mol), 30 g of triethylene glycol ($C_6H_{14}O_4$ 150.2 g/mol) was added. Upon heating, the mixture starts to melt around 100° C. With thorough stirring, it was slowly heated to around 200° C. During the heating, $NO_x$ gas was generated to yield foaming, and the viscosity of the solution has increased. As the heating was further continued, the reaction proceeded with generation of gas, and a precursor was obtained. The obtained precursor was pulverized with a planetary mill (400 rpm, for 20 minutes). The pulverized precursor was calcined for 10 hours at 950° C. to obtain a precursor of a positive electrode active material.

(Preparation of O2 Type $Li_xNi_{1/3}Mn_{2/3}O_2$)

30 g of the above precursor, 137.892 g of lithium nitrate ($LiNO_3$ 68.946 g/mol), and 26.77 g of lithium iodide (LiI 133.845 g/mol) were added to an aluminum crucible. After increasing the temperature to 280° C. over 3 hours, it was kept at 280° C. for 10 hours. The excess alkali metal salt was removed with hot water to obtain a positive electrode active material.

Example 10

(Preparation of P2 Type $Na_{2/3}Ni_{1/3}Mn_{2/3}O_2$; Co-Precipitation Method)

To 26.28 g of nickel sulfate hexahydrate ($NiSO_4 \cdot 6H_2O$ 262.85 g/mol) and 48.22 g of manganese sulfate pentahydrate ($MnSO_4 \cdot 5H_2O$ 241.08 g/mol), 250 ml of pure water was added followed by stirring and dissolution (S1). To 26.50 g of sodium carbonate ($Na_2CO_3$ 105.9884 g/mol), 250 ml of pure water was added followed by stirring and dissolution (S2). To 250 ml of pure water, 4 g of L-ascorbic acid was added and then heated to 50° C. under stirring with purge of carbon dioxide gas. To the resultant, each of (S1) and (S2) was added dropwise at rate of 1 ml/minute to form precipitates. When the dropwise addition is completed, it was maintained for 6 hours at 50° C. under stirring. The suspension was filtered by suction to obtain precipitates, and excess Na was washed with 3000 ml of pure water. After drying for 12 hours at 100° C., pre-calcination for 12 hours at 450° C. was performed, and a precursor was obtained. The obtained precursor was pulverized with a planetary mill (400 rpm, for 20 minutes). The pulverized precursor was calcined for 10 hours at 950° C. to obtain a precursor of a positive electrode active material.

(Preparation of O2 Type $Li_xNi_{1/3}Mn_{2/3}O_2$)

30 g of the above precursor, 137.892 g of lithium nitrate ($LiNO_3$ 68.946 g/mol), and 26.77 g of lithium iodide (LiI 133.85 g/mol) were added to an aluminum crucible. After increasing the temperature to 280° C. over 3 hours, it was kept at 280° C. for 10 hours. The excess alkali metal salt was removed with hot water to obtain a positive electrode active material.

Example 11

(Preparation of P2 Type $Na_{2/3}Ni_{2/9}Zn_{1/9}Mn_{2/3}O_2$; Molten Salt Method)

To 19.39 g of nickel nitrate hexahydrate ($Ni(NO_3)_2 \cdot 6H_2O$ 290.79 g/mol), 9.92 g of zinc nitrate hexahydrate ($Zn(NO_3)_2 \cdot 6H_2O$ 297.49 g/mol), 57.41 g of manganese nitrate hexahydrate ($Mn(NO_3)_2 \cdot 6H_2O$ 287.04 g/mol) and 17.00 g of sodium nitrate ($NaNO_3$ 84.99 g/mol), 30 g of triethylene glycol ($C_6H_{14}O_4$ 150.2 g/mol) was added. Upon heating, the mixture starts to melt around 100° C. With thorough stirring, it was slowly heated to around 200° C. During the heating, $NO_x$ gas was generated to yield foaming, and the viscosity of the solution has increased. As the heating was further continued, the reaction proceeded with generation of gas, and a precursor was obtained. The obtained precursor was pulverized with a planetary mill (400 rpm, for 20 minutes). The pulverized precursor was calcined for 10 hours at 950° C. to obtain a precursor of a positive electrode active material.

(Preparation of O2 Type $Li_xNi_{2/9}Zn_{1/9}Mn_{2/3}O_2$)

30 g of the above precursor, 137.892 g of lithium nitrate ($LiNO_3$ 68.946 g/mol), and 26.77 g of lithium iodide (LiI 133.845 g/mol) were added to an aluminum crucible. After increasing the temperature to 280° C. over 3 hours, it was kept at 280° C. for 10 hours. The excess alkali metal salt was removed with hot water to obtain a positive electrode active material.

Example 12

A positive electrode active material (O2 type $Li_xNi_{2/9}Cu_{1/9}Mn_{2/3}O_2$) was obtained in the same manner as Example 11 except that copper nitrate trihydrate ($Cu(NO_3)_2 \cdot 3H_2O$ 241.60 g/mol) was used instead of zinc nitrate hexahydrate.

Example 13

A positive electrode active material (O2 type $Li_xNi_{2/9}Co_{1/9}Mn_{2/3}O_2$) was obtained in the same manner as Example 11 except that copper nitrate trihydrate ($Co(NO_3)_2 \cdot 6H_2O$ 291.03 g/mol) was used instead of zinc nitrate hexahydrate.

Example 14

A positive electrode active material (O2 type $Li_xNi_{2/9}Fe_{1/9}Mn_{2/3}O_2$) was obtained in the same manner as Example 11 except that copper nitrate trihydrate ($Fe(NO_3)_2 \cdot 6H_2O$ 287.95 g/mol) was used instead of zinc nitrate hexahydrate.

Example 15

A positive electrode active material (O2 type $Li_xNi_{2/9}Al_{1/9}Mn_{2/3}O_2$) was obtained in the same manner as Example 11 except that aluminum nitrate nonahydrate ($Al(NO_3)_3 \cdot 9H_2O$ 375.13 g/mol) was used instead of zinc nitrate hexahydrate.

Example 16

A positive electrode active material (O2 type $Li_xNi_{2/9}Mg_{1/9}Mn_{2/3}O_2$) was obtained in the same manner as Example 11 except that magnesium nitrate hexahydrate ($Mg(NO_3)_2 \cdot 3H_2O$ 256.41 g/mol) was used instead of zinc nitrate hexahydrate.

Comparative Example 1

P3 type $Na_{2/3}Ni_{1/3}Mn_{2/3}O_2$ was obtained in the same manner as Example 1.

(Preparation of O3 type $Li_{2/3}Ni_{1/3}Mn_{2/3}O_2$)

30 g of the above precursor, 137.892 g of lithium nitrate ($LiNO_3$ 68.946 g/mol), and 8.5 g of lithium chloride (LiCl, 42.39 g/mol) were added to an aluminum crucible. After increasing the temperature to 280° C. over 3 hours, it was kept at 280° C. for 10 hours. The excess alkali metal salt was removed with hot water to obtain a positive electrode active material.

Comparative Example 2

P3 type $Na_{2/3}Fe_{1/3}Mn_{2/3}O_2$ was obtained in the same manner as Example 1 by using iron nitrate instead of nickel nitrate. A positive electrode active material (O3 type $Li_xFe_{1/3}Mn_{2/3}O_2$) was obtained by performing reduction-ion exchange in the same manner as Example 1.

Comparative Example 3

P3 type $Na_{2/3}Co_{1/3}Mn_{2/3}O_2$ was obtained in the same manner as Example 1 by using cobalt nitrate instead of nickel nitrate. A positive electrode active material (O3 type $Li_xCo_{1/3}Mn_{2/3}O_2$) was obtained by performing reduction-ion exchange in the same manner as Example 1.

Comparative Example 4

P2 type $Na_{2/3}Ni_{1/3}Mn_{2/3}O_2$ was obtained in the same manner as Example 9.
(Preparation of O2 type $Li_{2/3}Ni_{1/3}Mn_{2/3}O_2$)

30 g of the above precursor, 137.892 g of lithium nitrate ($LiNO_3$ 68.946 g/mol), and 8.5 g of lithium chloride (LiCl 42.39 g/mol) were added to an aluminum crucible. After increasing the temperature to 280° C. over 3 hours, it was kept at 280° C. for 10 hours. The excess alkali metal salt was removed with hot water to obtain a positive electrode active material.

Comparative Example 5

P2 type $Na_{2/3}Fe_{1/3}Mn_{2/3}O_2$ was obtained in the same manner as Example 9 by using iron nitrate instead of nickel nitrate. A positive electrode active material ($O_2$ type $Li_xFe_{1/3}Mn_{2/3}O_2$) was obtained by performing reduction-ion exchange in the same manner as Example 9.

Comparative Example 6

P2 type $Na_{2/3}Co_{1/3}Mn_{2/3}O_2$ was obtained in the same manner as Example 9 by using cobalt nitrate instead of nickel nitrate. A positive electrode active material (O2 type $Li_xCo_{1/3}Mn_{2/3}O_2$) was obtained by performing reduction-ion exchange in the same manner as Example 9.
(X-Ray Diffraction Measurement)

According to X-ray diffraction, the crystal structure and crystallinity of the above positive electrode active material were evaluated. As an X-ray source, Cu-Kα ray was used. Measurement conditions include the followings: tube voltage is 40 KV, tube current is 20 mA, scanning rate is 2°/minute, divergence slit width is 0.5°, and light receiving slit width is 0.15°.
(Fabrication of Positive Electrode Having Positive Electrode Active Material Layer Formed on One Surface of Current Collecting Foil)
(Composition of Slurry for Positive Electrode)

Slurry for a positive electrode has the following composition.

| | |
|---|---|
| Positive electrode active material (each positive electrode active material which has been prepared above) | 8.8 parts by weight |
| Conductive aid: Flake-shaped graphite | 0.3 part by weight |
| Acetylene black | 0.3 part by weight |
| Binder: Polyvinylidene fluoride (PVDF) | 0.6 part by weight |
| Solvent: N-methyl-2-pyrrolidone (NMP) | 8.2 parts by weight. |

(Preparation of Slurry for Positive Electrode)

Slurry for positive electrode with the composition described above was prepared as described below. First, to a 50 ml disposable cup, 0.6 part by weight of a conductive aid, 8.8 parts by weight of a positive electrode active material, and 3.2 parts by weight of a solvent (NMP) were added, and then stirred for 1 minute by using a stirring defoaming device (rotation and revolution mixer: AWATORI RENTARO AR-100) (A).

Next, in a 50 ml disposable cup, 2.6 parts by weight of a solvent (NMP) was added to 3.0 parts by weight of 20% binder solution in which a binder is dissolved in a solvent (NMP), and then it was stirred for 1 minute by using a stirring defoaming device to prepare a diluted binder solution (B).

Then, the above (B) was added to the above (A), and then stirred for 3 minutes by using a stirring defoaming device to have slurry for positive electrode (solid content concentration of 55% by weight).
(Coating and Drying of Slurry for Positive Electrode)

On one surface of an aluminum current collecting foil with thickness of 20 μm, the above slurry for positive electrode was coated by using an automatic coating device (doctor blade manufactured by TESTER SANGYO CO., LTD.; PI-1210 automatic coating device). Subsequently, the current collecting foil coated with the slurry for positive electrode was dried on a hot plate (100° C. to 110° C., drying time of 30 minutes) to lower the NMP amount remaining in the positive electrode active material layer to 0.02% by weight or less, and thus a sheet-like positive electrode was formed.
(Pressing of Positive Electrode)

The above sheet-like positive electrode was applied to a roller press and subjected to compression molding followed by cutting. As a result, the weight of positive electrode active material layer on one surface was prepared to about 3.5±0.2 mg/cm$^2$ and the density was prepared to 2.5±0.1 g/cm$^3$.
(Drying of Positive Electrode)

Next, the sheet-like positive electrode was subjected to a drying treatment in a vacuum drying furnace. After adding the sheet-like positive electrode to the inside of a drying furnace, air in the drying furnace was removed by lowering the pressure (100 mmHg (1.33×10$^4$ Pa)) at room temperature (25° C.). Subsequently, while purging with nitrogen gas (100 cm$^3$/minute), the temperature was increased to 120° C. at rate of 10° C./minute. After lowering the pressure again at 120° C. and discharging the nitrogen inside the furnace, it was maintained for 12 hours. Thereafter, the temperature was lowered to room temperature. Accordingly, a positive electrode in which moisture has been removed from a surface of the positive electrode was obtained.
[Determination of Capacity of Positive Electrode]
[Fabrication of Coin Cell]

The above positive electrode (punched to have a diameter of 15 mm) and a counter electrode consisting of lithium foil (manufactured by Honjo Metal Co., Ltd., diameter of 16 mm and thickness of 200 μm) were disposed to face each other while they are intermediated by a separator (Celgard 2400 manufactured by Celgard, LLC, diameter of 17 mm). Then, by injecting an electrolyte solution, a CR2032 type coin cell was fabricated.

Meanwhile, as an electrolyte solution, a solution containing $LiPF_6$ (lithium hexafluoride) dissolved to have a concentration of 1 M in a mixed non-aqueous solvent in which ethylene carbonate (EC) and diethyl carbonate (DEC) are mixed at a volume ratio of 1:1 was used.

By using a charge and discharge tester (HJ0501SM8A, manufactured by HOKUTO DENKO CORP.), the activation treatment and performance evaluation were performed in a constant temperature reservoir (PFU-3K, manufactured by ESPEC Corp.) which has been set at the temperature of 298 K (25° C.).
[Activation Treatment]

A cycle including charging to have voltage of 4.5 V by constant current charge method at 0.1 C followed by discharging at 0.1 C to 2.0 V was performed 2 times at 25° C. Similarly, at 25° C., a cycle including charging to have voltage of 4.6 V by constant current charge method at 0.1 C followed by discharging at 0.1 C to 2.0 V was performed once and a cycle including charging at 0.1 C to have voltage of 4.7 V followed by discharging at 0.1 C to 2.0 V was performed once. In addition, at 25° C., a cycle including charging to have voltage of 4.8 V by constant current charge method at 0.1 C followed by discharging at 0.1 C to 2.0 V was performed once, and after that, charging at 0.1 C till to have maximum voltage of 4.8 V, and then maintaining about 1 to 1.5 hours by constant current and constant voltage charge method was performed, and for the discharging, constant current discharge method was performed by discharging at 0.1 C till to have minimum battery voltage of 2.0 V.

[Evaluation of Performance]

For evaluation of a battery, for the charge, constant current and constant voltage charge method of charging at 0.1 C till to have maximum voltage of 4.5 V, and after that, maintaining about 1 to 1.5 hours was performed, for the discharge, constant current discharge method of discharging at 0.1 C till to have minimum voltage of 2.0 V was performed. At that time, the discharge capacity at 0.1 C rate was used as "0.1 C discharge capacity (mAh/g)", and the voltage at discharge capacity of 50% was used as "average voltage (V)."

[Evaluation of Lifetime]

For lifetime test of a battery, 100 cycles of the aforementioned charge and discharge at 0.1 C were performed at 25° C. The evaluation of battery performance after the lifetime test was performed according to constant current and constant voltage charge method which includes charging at 0.1 C till to have maximum voltage of 4.5 V. The discharging was performed according to constant current discharge method which includes discharging at 0.1 C till to have minimum voltage of 2.0 V. Both were performed at room temperature.

The ratio of discharge capacity at 100th cycle to the discharge capacity at 1st cycle was used as "capacity retention rate (%)."

$$\text{Discharge capacity retention rate (\%)} = \frac{\text{Discharge capacity at 100th cycle}}{\text{Discharge capacity at 1st cycle}} \times 100 \quad \text{[Mathematical Formula 1]}$$

The results are given in Table 1.

TABLE 1

| | Structure | Composition Formula | Treatment method | 0.1 C Discharge capacity mAh/g | Average voltage V | Capacity retention rate % |
|---|---|---|---|---|---|---|
| Example 1 | O3 | $Li_xNi_{1/3}Mn_{2/3}O_2$ (Molten salt method) | Reduction-ion exchange | 175 | 3.41 | 85 |
| Example 2 | O3 | $Li_xNi_{1/3}Mn_{2/3}O_2$ (Co-precipitation method) | Reduction-ion exchange | 180 | 3.42 | 87 |
| Example 3 | O3 | $Li_xNi_{2/9}Zn_{1/9}Mn_{2/3}O_2$ (Molten salt method) | Reduction-ion exchange | 177 | 3.41 | 88 |
| Example 4 | O3 | $Li_xNi_{2/9}Cu_{1/9}Mn_{2/3}O_2$ (Molten salt method) | Reduction-ion exchange | 178 | 3.41 | 87 |
| Example 5 | O3 | $Li_xNi_{2/9}Co_{1/9}Mn_{2/3}O_2$ (Molten salt method) | Reduction-ion exchange | 208 | 3.42 | 89 |
| Example 6 | O3 | $Li_xNi_{2/9}Fe_{1/9}Mn_{2/3}O_2$ (Molten salt method) | Reduction-ion exchange | 192 | 3.44 | 90 |
| Example 7 | O3 | $Li_xNi_{2/9}Al_{1/9}Mn_{2/3}O_2$ (Molten salt method) | Reduction-ion exchange | 198 | 3.41 | 91 |
| Example 8 | O3 | $Li_xNi_{2/9}Mg_{1/9}Mn_{2/3}O_2$ (Molten salt method) | Reduction-ion exchange | 180 | 3.41 | 92 |
| Example 9 | O2 | $Li_xNi_{1/3}Mn_{2/3}O_2$ (Molten salt method) | Reduction-ion exchange | 170 | 3.41 | 83 |
| Example 10 | O2 | $Li_xNi_{1/3}Mn_{2/3}O_2$ (Co-precipitation method) | Reduction-ion exchange | 175 | 3.41 | 85 |
| Example 11 | O2 | $Li_xNi_{2/9}Zn_{1/9}Mn_{2/3}O_2$ (Molten salt method) | Reduction-ion exchange | 172 | 3.41 | 87 |
| Example 12 | O2 | $Li_xNi_{2/9}Cu_{1/9}Mn_{2/3}O_2$ (Molten salt method) | Reduction-ion exchange | 173 | 3.41 | 86 |
| Example 13 | O2 | $Li_xNi_{2/9}Co_{1/9}Mn_{2/3}O_2$ (Molten salt method) | Reduction-ion exchange | 205 | 3.40 | 88 |
| Example 14 | O2 | $Li_xNi_{2/9}Fe_{1/9}Mn_{2/3}O_2$ (Molten salt method) | Reduction-ion exchange | 213 | 3.42 | 89 |
| Example 15 | O2 | $Li_xNi_{2/9}Al_{1/9}Mn_{2/3}O_2$ (Molten salt method) | Reduction-ion exchange | 198 | 3.43 | 90 |
| Example 16 | O2 | $Li_xNi_{2/9}Mg_{1/9}Mn_{2/3}O_2$ (Molten salt method) | Reduction-ion exchange | 175 | 3.41 | 92 |
| Comparative Example 1 | O3 | $Li_{2/3}Ni_{1/3}Mn_{2/3}O_2$ (Molten salt method) | Ion exchange | 155 | 3.20 | 75 |
| Comparative Example 2 | O3 | $Li_xFe_{1/3}Mn_{2/3}O_2$ (Molten salt method) | Reduction-ion exchange | 145 | 3.25 | 80 |
| Comparative Example 3 | O3 | $Li_xCo_{1/3}Mn_{2/3}O_2$ (Molten salt method) | Reduction-ion exchange | 160 | 3.25 | 82 |
| Comparative Example 4 | O2 | $Li_{2/3}Ni_{1/3}Mn_{2/3}O_2$ (Molten salt method) | Ion exchange | 151 | 3.18 | 70 |
| Comparative Example 5 | O2 | $Li_xFe_{1/3}Mn_{2/3}O_2$ (Molten salt method) | Reduction-ion exchange | 143 | 3.20 | 75 |
| Comparative Example 6 | O2 | $Li_xCo_{1/3}Mn_{2/3}O_2$ (Molten salt method) | Reduction-ion exchange | 158 | 3.19 | 77 |

As shown in Table 1 above, the lithium ion secondary battery using the positive electrode active material of Examples 1 to 16, which has a pre-determined composition and has been obtained by reduction-ion exchange, has a significantly high capacity retention rate. Excellent results were also obtained in terms of 0.1 C discharge capacity and average voltage of a battery. In this regard, it is believed that, as the sodium compound as a precursor of a positive electrode active material is converted by reduction-ion exchange to a lithium compound, elution of the transition metal (Ni, Mn) in the positive electrode active material is inhibited.

REFERENCE SIGNS LIST

10a Parallel laminated type battery
11 Negative electrode current collector
11a Outermost layer negative electrode current collector
12 Negative electrode active material layer
13 Electrolyte layer
14 Positive electrode current collector
15 Positive electrode active material layer
16 Single battery layer
17 Power generating element
18 Negative electrode current collecting plate
19 Positive electrode current collecting plate
20 Negative electrode terminal lead
21 Positive electrode terminal lead
22 Laminate film

The invention claimed is:

1. A positive electrode active material for a non-aqueous electrolyte secondary battery represented by Composition Formula (2): $Li_x[Ni_{(1/3-a)}[M]_a Mn_{2/3}]O_2$ (in the formula, M represents at least one element selected from the group consisting of Cu, Zn, Mg, Fe, Al, Co, Sc, Ti, V, Cr, Ga, Ge, Bi, Sn, Ca, B, and Zr, $0 \leq a \leq \frac{1}{6}$, and x represents the number of Li satisfying the atomic valence), which is obtained by reduction-ion exchange of a precursor of the positive electrode active material that is represented by Composition Formula (1): $Na_{2/3}[Ni_{(1/3-a)}[M]_a Mn_{2/3}]O_2$ (in the formula, M represents at least one element selected from the group consisting of Cu, Zn, Mg, Fe, Al, Co, Sc, Ti, V, Cr, Ga, Ge, Bi, Sn, Ca, B, and Zr and $0 \leq a \leq \frac{1}{6}$).

2. A positive electrode active material for a non-aqueous electrolyte secondary battery represented by Composition Formula (2): $Li_x[Ni_{(1/3-a)}[M]_a Mn_{2/3}]O_2$ (in the formula, M represents at least one element selected from the group consisting of Cu, Zn, Mg, Fe, Al, Co, Sc, Ti, V, Cr, Ga, Ge, Bi, Sn, Ca, B, and Zr, $0 \leq a \leq \frac{1}{6}$, and x represents the number of Li satisfying the atomic valence), which has diffraction peaks at 20°-23°, 35°-40°, 42°-46°, and 64°-65°/65°-66° according to X-ray diffraction measurement and a peak intensity ratio of 42°-46° (104) relative to 17°-20° (003) of 0.60 or less.

* * * * *